US008116798B2

(12) United States Patent
Kuehner et al.

(10) Patent No.: US 8,116,798 B2
(45) Date of Patent: Feb. 14, 2012

(54) METHOD TO INDICATE STATUS OF CHANNELS ASSIGNED TO A TALKGROUP IN A MULTI-SITE CONVENTIONAL COMMUNICATION SYSTEM

(75) Inventors: Nathanael P. Kuehner, Palatine, IL (US); Gerald R. Drobka, Naperville, IL (US); James E. Eastwood, Bellingham, WA (US); Todd A. Leigh, East Lansing, MI (US); Timothy G. Woodward, Tempe, AZ (US)

(73) Assignee: Motorola Solutions, Inc., Schaumburg, IL (US)

( * ) Notice: Subject to any disclaimer, the term of this patent is extended or adjusted under 35 U.S.C. 154(b) by 518 days.

(21) Appl. No.: 12/344,932

(22) Filed: Dec. 29, 2008

(65) Prior Publication Data

US 2010/0167774 A1 Jul. 1, 2010

(51) Int. Cl.
*H04W 4/06* (2009.01)
(52) U.S. Cl. .......................... 455/518; 455/520; 370/450
(58) Field of Classification Search .................. 455/509, 455/510, 518, 519, 520, 552.1, 553.1, 426.1; 370/449, 450, 496, 526
See application file for complete search history.

(56) References Cited

U.S. PATENT DOCUMENTS

| | | | | | |
|---|---|---|---|---|---|
| 5,241,537 | A | * | 8/1993 | Gulliford et al. | 370/341 |
| 5,265,262 | A | * | 11/1993 | Grube et al. | 455/17 |
| 5,442,809 | A | * | 8/1995 | Diaz et al. | 455/511 |
| 6,252,859 | B1 | * | 6/2001 | Rhodes et al. | 370/329 |
| 6,498,787 | B1 | * | 12/2002 | Yi et al. | 370/328 |
| 2008/0009308 | A1 | | 1/2008 | Bar et al. | |
| 2008/0161029 | A1 | * | 7/2008 | McDonald et al. | 455/509 |
| 2008/0207241 | A1 | | 8/2008 | Namm et al. | |
| 2008/0311946 | A1 | | 12/2008 | Britton | |

OTHER PUBLICATIONS

PCT International Search Report Dated Aug. 13, 2010.

* cited by examiner

*Primary Examiner* — Howard Williams
(74) *Attorney, Agent, or Firm* — Valerie M. Davis; Randi L. Karpinia

(57) ABSTRACT

A method for indicating the status of communication channels assigned to a talkgroup includes: determining the channels in various sites in a conventional communication system that service a talkgroup for media transmissions between subscribers of the talkgroup; receiving notification of the status of transmission activity on the channels; and based on the notification, providing an indication of the status of the channels assigned to the talkgroup so that the talkgroup or subscribers of the talkgroup can choose to proceed with a talkgroup communication. The notification may be received by an infrastructure device in an RF site or a central controlling entity. The indication may be that the channel is free for transmissions or is busy.

17 Claims, 3 Drawing Sheets

METHOD TO INDICATE STATUS OF CHANNELS ASSIGNED TO A TALKGROUP IN A MULTI-SITE CONVENTIONAL COMMUNICATION SYSTEM

TECHNICAL FIELD

The technical field relates generally to a wireless communication system, and in particular, it relates to a method to notify a talkgroup of the status of channels used by the talkgroup, wherein the channels are at a plurality of sites within a multi-site conventional communication system.

BACKGROUND

Multi-site (or "wide area") communication systems provide wide-area coverage for users (also referred to herein as "subscribers) of the system. These systems comprise a number of sites (or radio frequency (RF) sites), with each site corresponding to a different geographic coverage area and each site having located therein an infrastructure device (also referred to herein as a "repeater") serving the coverage area by managing one or more channels in the coverage area. Accordingly, for purposes of the teachings herein, a site is characterized by a repeater that serves a particular coverage area and a channel for wireless communication device transmissions. Some or all of the infrastructure devices in a multi-site communication system may be networked or connected together via a backend network to provide the wide-area coverage via one or more logical wide-area channels, and in many instances two or more of the coverage areas have some degree of overlap.

Multi-site communication systems may be designed as trunked systems or conventional systems. In trunked systems, a limited number of communication channels are shared among a much larger number of subscribers to facilitate efficient use of the system's communication resources. Thus, to afford each subscriber a reasonable opportunity to use the system's resources, one or more control channels are utilized by the infrastructure to allocate and switch the shared resources between the many subscribers in the system. In general, when a subscriber wants to communicate on the trunked system, he or she sends a request via a wireless communication unit (hereinafter referred to as a "subscriber unit") on the control channel to communicate with another subscriber or group of subscribers (also referred to herein as a "talkgroup") on their subscriber units. In turn, the requesting subscriber unit (and the subscriber units to which it attempts to communicate) receives back on the control channel the allocation of a traffic channel to use for communicating. Upon the conclusion of the communication, the allocated channel is released for use by other subscriber units in the system.

In conventional systems, a number of communication channels are also shared amongst a number of subscribers (although the number of subscribers per channel is typically much smaller than in trunked systems). However, there is no control or switching mechanism provisioned in the infrastructure to allocate the resources among the subscribers in the system. Thus, in contrast to a trunked system, each channel in a conventional system is dedicated to one or more talkgroups enabling the subscriber members of each assigned talkgroup to control access to the channel through their subscriber units by manually selecting the channel or selecting the talkgroup that is assigned to the channel in order to start a communication session and transmit and receive media during the session.

A subscriber of a talkgroup in a conventional communication system is required, before talking on their subscriber unit, to determine whether another subscriber is already talking on the current communication channel allocated to that talkgroup for use. If the channel is busy or already in use, the subscriber must wait until the channel is available in order to make a call. Existing conventional communication systems rely on the fact that, generally, all of the subscribers in a talkgroup are served by the same communication channel at the same site. Namely, when all the subscribers of a talkgroup are served at the same RF site, determining the availability of the communication channel is relatively simple. Because all individual subscribers of a talkgroup are sharing the same communication channel, the subscribers can simply listen to the communication channel on their communication or subscriber unit(s) to detect whether or not the channel is currently being used by another. When a first subscriber unit detects activity on the communication channel, the first subscriber unit indicates this as appropriate to the first subscriber. The first subscriber, therefore, knows that the channel is busy. The conventional communication network infrastructure is not required to do anything special to determine or indicate that the channel is busy because the presence of audio transmissions is sufficient indication to the subscribers.

If no other subscriber is currently actively using the communication channel, then the subscriber can begin audio, knowing that other subscribers of the same talkgroup on their communication channel will be able to hear the audio when it is repeated by the channel's base repeater or RF site. This works for communication subscribers who all share a single channel at a single RF site. Unfortunately, subscribers who are not served at the same RF site are not aware of when the communication channel ascribed to their talkgroup in a different RF site is busy.

Talkgroup subscribers may not all be served by a single base repeater or RF site, as in the case of a communication network having multiple channels spread across multiple RF sites which are interconnected to form a conventional wide area communication network. Such a network gives rise to the problem of a talkgroup having subscribers spanning more than one channel (i.e., subscribers present at more than one RF site). The talkgroup subscribers at one channel (RF site) have no way of knowing whether or not the communication channels used by their talkgroup at other RF sites are already in use. While the talkgroup's communication channel at the subscriber's own RF site may be available, the talkgroup's communication channel at one or more of their talkgroup's other RF sites may already be in use by other subscribers or talkgroups. If a first subscriber at a first RF site begins to talk, members of their talkgroup at the first RF site will hear the audio, but members of their talkgroup at other RF sites where the talkgroup's channel is already in use by other subscribers will not hear the first subscriber's audio.

Accordingly, there is a need for a method to alert subscribers about activity on the communication channels allocated to their talkgroup at other sites within a conventional wide area communication system.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
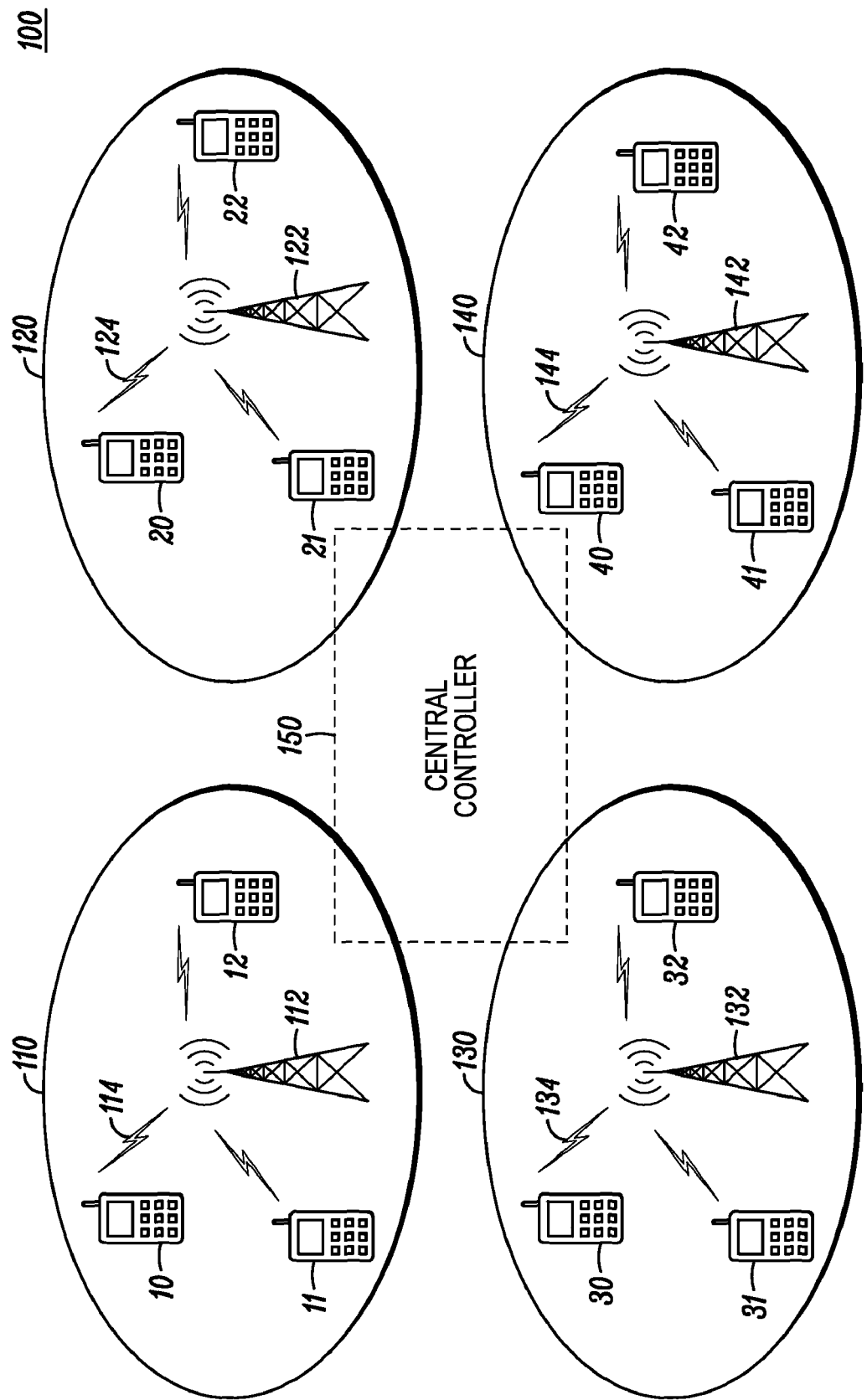
FIG. 1 illustrates a diagram of multi-site communication system in which may be implemented by some illustrative embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method for indicating the status of channels assigned to a talkgroup in a conventional communication system includes determining that a given talkgroup is assigned to a channel in a first RF site and at least one other channel in another RF site. An infrastructure device, such as a repeater, or a central controller, receives notification of the status of each of these channels assigned to the given talkgroup, e.g., whether the channel(s) is free or busy. Based on this information, the infrastructure device or controller provides indication to subscriber units or talkgroups of the status of the channels assigned to the talkgroup. The subscriber can use this indication to determine whether to proceed with a transmission.

This method provides a novel way of enabling talkgroups, subscribers, and/or subscriber units to ascertain whether the channels of a conventional multi-site communication network that serve their talkgroups are busy with call activity. A subscriber of a talkgroup attempting to transmit a message to the talkgroup, having other subscribers present in different sites, will be aware of the status of the channels assigned to the talkgroup in those sites, and thus, will know when a subscriber will not receive the transmission because the channel assigned to the talkgroup in that site is busy. This enables the extension of conventional systems to multiple channels over multiple sites while still enabling subscribers to check for other call activity prior to talking on their subscriber units.

Those skilled in the art will realize that the above recognized advantages and other advantages described herein are merely illustrative and are not meant to be a complete rendering of all of the advantages of the various embodiments.

The present method can be embodied either with or without a central controlling entity. With respect to FIG. 1, an embodiment of a conventional wide area communication system 100 is shown with an optional central controlling entity 150. The wide area communication network 100 has multiple RF sites 110, 120, 130, and 140, with the geographic coverage areas being represented by the circles. The RF sites each have an infrastructure device (e.g., 112, 122, 132, 142) that manages a channel (e.g., 114, 124, 134, 144) used by the subscriber units ("SU") 10, 11, 12, 20, 21, 22, 30, 31, 32, 40, 41, 42 for their communications. Each RF site services one or more talkgroups. In the present example, the RF sites each service three talkgroups ("TG"). The talkgroups TG A, B, C, D, E, F, G, H, and I are each composed of subscribers using subscriber units SU 10, 11, 12, 20, 21, 22, 30, 31, 32, 40, 41, and 42.

As used herein, an infrastructure device is a device that is a part of a fixed network infrastructure and can receive information (either control or media, e.g., data, voice (audio), video, etc.) in a signal from a wireless communication device and transmit information in signals to one or more wireless communication devices via a communication link. An infrastructure device includes, but is not limited to, equipment commonly referred to as servers, base stations, base transceiver stations, access points, routers, or any other type of infrastructure equipment interfacing a wireless communication device or subscriber unit in a wireless environment.

In accordance with the teachings herein, an infrastructure device or central controlling entity in a conventional wide area communication system notifies subscribers of talkgroups that the talkgroup's channel at another RF site is currently busy transmitting audio for another talkgroup or subscriber. Moreover, each infrastructure device (or central controlling entity) determines when to notify subscribers or talkgroups (through an infrastructure device) of the status of one of its talkgroup's channels, such that the subscribers can determine when their talkgroup's channel(s) at other sites are no longer busy. The infrastructure device indicates each of the following to other infrastructure devices at other RF sites (or to a central controlling entity): the list or identity of the talkgroups that it is serving; the list or identity of the talkgroups or channels that are currently busy with talker activity; and/or the list or identity of the talkgroups or channels that are no longer busy with talker activity.

As referred to herein, a subscriber unit includes, but is not limited to, devices commonly referred to as access terminals, mobile radios, mobile stations, wireless communication devices, user equipment, mobile devices, or any other device capable of operating in a wireless environment. Examples of subscriber units include, but are not limited to, two-way radios, mobile phones, cellular phones, Personal Digital Assistants (PDAs), laptops, and pagers. Moreover, a talkgroup is a group or collection of members, subscribers, and/or subscriber units configured for group communication over a communication system. Also, in general, communication links (also referred to herein as channels) comprise the physical and/or non-tangible communication resources (e.g., radio frequency (RF) resources) over which information is sent between elements within the wide area communication network 100. Communication links can be wireless or wired.

Table 1 below, in conjunction with FIG. 1, illustrates the allocation of RF sites, subscriber units SUs, and talkgroups TGs.

TABLE 1

RF Site (RF), Channel (CHL), Subscriber Unit (SU), and Talkgroup (TG) Association List

| RF 110, CHL 114 | RF 120, CHL 124 | RF 130, CHL 134 | RF 140, CHL 144 |
|---|---|---|---|
| SU 10, TG A | SU 20, TG C | SU 30, TG C | SU 40, TG B |
| SU 11, TG B | SU 21, TG D | SU 31, TG F | SU 41, TG H |
| SU 12, TG C | SU 22, TG E | SU 32, TG G | SU 42, TG I |

RF 110 services TG a (SU 10), TG B (SU 11), and TG C (SU 12). RF 120 services TG C (SU 20), TG D (SU 21), and TG E (SU 22). RF 130 services TG C (SU 30), TG F (SU 31), and TG G (SU 32). RF 140 services TG B (SU 40), TG H (SU 41), and TG I (SU 42).

Each infrastructure device at each RF site has a notification list of the channels at other RF sites within the wide area communication network. The infrastructure device sends to the other infrastructure devices on its notification list the list or identity of talkgroups the first infrastructure device is currently serving, and indications of its communication activity. The list may be pre-configured at each RF site or it may be obtained by some other means. TABLES 2 and 3 below illustrate an example of the notification list for the infrastructure devices corresponding to the RF sites and channels of FIG. 1 and TABLE 1.

TABLE 2

Example Notification Lists

| RF Site-Channel | RF Site-Channel "Notification List" |
|---|---|
| 110-114 | 120-124, 130-134, 140-144 |
| 120-124 | 110-114, 130-134, 140-144 |
| 130-134 | 110-114, 120-124, 140-144 |
| 140-144 | 110-114, 120-124, 130-134 |

TABLE 3

Example Served Talkgroup Lists

| RF Site-Channel | Served Talkgroup List |
|---|---|
| 110-114 | A, B, C - sent to each infrastructure device in RF channel 110-114's Notification List |
| 120-124 | C, D, E - sent to each infrastructure device in RF channel 120-124's Notification List |
| 130-134 | C, F, G - sent to each infrastructure device in RF channel 130-134's Notification List |
| 140-144 | B, H, I - sent to each infrastructure device in RF channel 140-144's Notification List |

Each infrastructure device sends messages to or otherwise notifies infrastructure devices on its notification list of the list/identity of talkgroups it is currently serving. For example, the infrastructure device for RF site 110 channel 114 notifies the infrastructure device for RF 120 channel 124, RF 130 channel 134, and RF 140 channel 144 that RF 110 channel 114 is serving TG A, B, and C. Likewise, the infrastructure device for RF 120 channel 124 notifies the infrastructure device for RF 110 channel 114, RF 130 channel 134, and RF 140 channel 144 of the talkgroups which RF 120 channel 124 is serving, that being TG C, D, and E. Infrastructure device for RF 130 channel 134 notifies the infrastructure devices for RF 110 channel 114, RF 120 channel 124, and RF 140 channel 144 of the talkgroups which RF 130 channel 134 is serving, that being TG C, F, and G. The infrastructure device for RF 140 channel 144 notifies the infrastructure devices for RF 110 channel 114, RF 120 channel 124, and RF 130 channel 134 of the talkgroups which RF 140 channel 144 is serving, that being TG B, H, and I.

These messages may be transmitted upon channel initialization, periodically, when requested, and/or when there is a change in the list of talkgroups that are being served by the channel. The infrastructure device for a channel may determine the list of talkgroups that the channel is currently serving by pre-configuration, and/or by dynamic affiliation of subscribers with talkgroups, and/or by receiving their call activity. By means of these messages, each infrastructure device in the wide area communication network knows the list of talkgroups that every other RF site/channel on its notification list is currently serving. Each infrastructure device, therefore, also knows the RF site and channels within its notification list which are serving each talkgroup in the wide area communication network and can determine that a first channel at a first site in a conventional communication system and a second channel at a second different site in the conventional communication system are both assigned for use by a first talkgroup for media transmissions between subscribers of the first talkgroup.

When any type of communication or "call" begins (e.g. talkgroup call, individual call, etc.), the infrastructure device for the call's originating RF site/channel notifies the infrastructure devices for each RF site/channel on its notification list. In other words, each infrastructure device receives notification of status of transmission activity on the first channel. The notification may include information regarding the originating RF site/channel and, for a talkgroup call, may include the talkgroup's identity (e.g. TGA, TGB, TBC, etc.). If the call is for a talkgroup which spans multiple RF site/channels, then the call's originating infrastructure device may also notify other infrastructure devices having talkgroups affected by the activity on the channel. Alternatively, it may be left to the call's other participating infrastructure devices to notify the talkgroups they serve.

Each infrastructure device which is notified of a call determines, for each talkgroup that it serves, whether one of that talkgroup's serving channels is participating in the call. If so, the notified infrastructure device transmits a message to the talkgroup's subscriber units indicating that one or more of the talkgroup's serving channels is currently busy or not available for other communication. Notified infrastructure devices may retransmit this message periodically, providing an indication of the status of the channels assigned to the talkgroup. A talkgroup's subscriber unit, upon receiving this message, indicates to its subscriber that one or more of the talkgroup's channels are currently busy. Table 4 below illustrates various call and notification scenarios.

TABLE 4

Example Call Notification Scenarios

| RF Site-Channel | Active Talkgroup | Active RF Site-Channels | Wide-Area Talkgroups Receiving "Busy" Signal at Originating Channel | Wide-Area Talkgroups Receiving "Busy" Signal on Active Talkgroup's Other RF Site Channels | Notified RF site/Channels (Notified Talkgroups on RF site-channel) |
|---|---|---|---|---|---|
| 110-114 | A | 110-114 | B C | None (because B and C are served by originating RF channel and A is not wide area) | 120-124 (C) 130-134 (C) 140-144 (B) |

TABLE 4-continued

Example Call Notification Scenarios

| RF Site-Channel | Active Talkgroup | Active RF Site-Channels | Wide-Area Talkgroups Receiving "Busy" Signal at Originating Channel | Wide-Area Talkgroups Receiving "Busy" Signal on Active Talkgroup's Other RF Site Channels | Notified RF site/Channels (Notified Talkgroups on RF site-channel) |
|---|---|---|---|---|---|
| | B | 110-114<br>140-144 | C | None (because C is served by originating RF channel) | 120-124 (C)<br>130-134 (C) |
| | C | 110-114<br>120-124<br>130-134 | B | None (because B is served by originating RF channel) | 140-144 (B) |
| 120-124 | C | 110-114<br>120-124<br>130-134 | Not applicable (D & E are not Wide Area) | B (because B is not served by originating site, but is still affected by TG C calls) | 140-144 (B) |
| | D | 120-124 | C | None (because B is not served by originating site, and is not affected by TG D calls) | 110-114 (C)<br>130-134 (C) |
| | E | 120-124 | C | None | 110-114 (C)<br>130-134 (C) |
| 130-134 | C | 110-114<br>120-124<br>130-134 | Not applicable (F & G are not wide area) | B (because B is not served by originating site, but is still affected by TG C calls) | 140-144 (B) |
| | F | 130-134 | C | None (because B is not served by originating site, and is not affected by TG F calls) | 110-114 (C)<br>120-124 (C) |
| | G | 130-134 | C | None (because B is not served by originating site, and is not affected by TG G calls) | 110-114 (C)<br>120-124 (C) |
| 140-144 | B | 110-114<br>140-144 | Not applicable (H and I are not wide area) | C (because C is not served by originating site, but is still affected by TG B calls) | 120-124 (C)<br>130-134 (C) |
| | H | 140-144 | B | None (because C is not served by originating site, and is not affected by TG H calls) | 110-114 (B) |
| | I | 140-144 | B | None (because C is not served by originating site, and is not affected by TG I calls) | 110-114 (B) |

For example, when a subscriber in TG A is active on channel 114 in RF 110, the infrastructure device 112 for RF 110 channel 114 notifies the RF sites serving wide area communication TGs B and C that RF 110 channel 114 is active. In the present example, only TGs B and C are wide area communication talkgroups (i.e., TGs B and C have subscribers being served by multiple RF sites). Thus, RF 120 channel 124 (serving TG C), RF 130 channel 134 (serving TG C), and RF 140 channel 144 (serving TG B) are notified that RF 110 channel 114 is unavailable for audio. The infrastructure device 112 for RF 110 channel 114 need not notify itself because TG B and C subscribers served by RF 110 channel 114 know RF 110 channel 114 is active simply by hearing the audio.

Similarly, when TG B is active on channel 114 in RF 110, the infrastructure device 112 of RF 110 channel 114 notifies the RF sites serving wide area communication TG C that RF 110 channel 114 is active. TG A is not a wide area talkgroup and is served only by RF 110 channel 114, thus it need only listen to RF 110 channel 114 to determine its availability. The infrastructure device 122, 132, of RF site/channels serving subscribers of wide area communication TGs, however, are notified that RF 110 channel 114 is unavailable for audio. Thus, RF 120 channel 124 (serving TG C) and RF 130 channel 134 (also serving TG C), are notified that RF 110 channel 114 is unavailable for audio. Infrastructure device 112 of RF 110 channel 114 need not notify itself because TG A and C subscribers served by RF 110 channel 114 know RF 110 channel 114 is active just by hearing the audio. In addition, RF 110 channel 114 need not notify infrastructure device 142 of RF 140 channel 144, if the call is a TG call (as opposed to an individual call), because the subscribers in TG B being served by RF 140 are participating in the call originated in RF 110 channel 114. If however, a subscriber in TG B, served by RF 110 channel 114, is making an individual, rather than a talkgroup call, infrastructure device 142 of RF 140 channel 144 is notified that RF 110 channel 114 is active and not available for audio.

When TG C is active on channel 114 in RF 110, the infrastructure device of RF 110 channel 114 notifies the infrastructure device for the RF sites serving wide area communication TG B that RF 110 channel 114 is active. TG A is not a wide area talkgroup and is served only by RF 110 channel 114, thus it need only listen to RF 110 channel 114 to determine its availability. The infrastructure devices for RF site/channels serving subscribers of wide area communication TGs, however, are notified that RF 110 channel 114 is unavailable for audio. Thus, the infrastructure device 142 of RF 140 channel 144 (serving TG B) is notified that RF 110 channel 114 is unavailable for audio. The infrastructure device for RF 110 channel 114 need not notify itself because TG A and B subscribers served by RF 110 channel 114 know RF 110 channel 114 is active just by hearing the audio. In addition, infrastructure device 122 of RF 120 channel 124 and infrastructure device 132 of RF 130 channel 134 need not be notified if the call is a TG call (as opposed to an individual call) because the subscribers in TG C being served in RF 120 and 3 are participating in the call originated in RF 110 channel 114. If however, a subscriber in TG C served by RF 110 channel 114 is making an individual, rather than a talkgroup call, the infrastructure devices 122 and 132 for RF 120 channel 124 and RF 130 channel 134 are notified that RF 110 channel 114 is active and not available for audio.

In another example, when TG C is active on channel 124 in RF 120, the infrastructure device 122 for RF 120 channel 124 notifies the infrastructure device for RF sites serving wide area communication TG B that RF 120 channel 124 is active. Talkgroups D and E are not wide area talkgroups and are served only by RF 120 channel 124, thus TG D and E subscribers need only listen to RF 120 channel 124 to determine its availability. The infrastructure devices for RF site/channels serving subscribers of wide area communication TGs, however, are notified that RF 120 channel 124 is unavailable for audio. Thus, the infrastructure device 142 for RF 140 channel 144 (serving TG B) is notified that RF 120 channel 124 is unavailable for audio. The infrastructure device 122 of RF 120 channel 124 need not notify itself because TG D and E subscribers served by RF 120 channel 124 know RF 120 channel 124 is active just by hearing the audio. In addition, the infrastructure device 122 of RF 120 channel 124 need not notify the infrastructure devices RF 110 channel 114 and RF 130 channel 134 if the call is a talkgroup call (as opposed to an individual call) because the subscribers in TG C being served in RFs 110 and 130 are participating in the call originated in RF 120 channel 124. If however, a subscriber in TG C, served by RF 120 channel 124, is making an individual, rather than a talkgroup call, the infrastructure devices 112, 132 of RF 110 channel 114 and RF 130 channel 134 respectively, are notified that RF 120 channel 124 is active and not available for audio.

In another example, when TG D is active on channel 124 in RF 120, the infrastructure device 122 of RF 120 channel 124 notifies the infrastructure devices of RF sites serving wide area communication TG C that RF 120 channel 124 is active. TG E is not a wide area talkgroup and is served only by RF 120 channel 124, thus TG E subscribers need only listen to RF 120 channel 124 to determine its availability because they are served by the same RF/channel from which the call originated. The infrastructure devices for RF site/channels serving subscribers of wide area communication TGs, however, are notified that RF 120 channel 124 is unavailable for audio. Thus, the infrastructure devices 112, 132 of RF 110 channel 114 (serving TG C) and RF 130 channel 134 (also serving TG C) are notified that RF 120 channel 124 is unavailable for audio. The infrastructure device 122 for RF 120 channel 124 need not notify itself because TG C and E subscribers served by RF 120 channel 124 know RF 120 channel 124 is active just by hearing the audio. The infrastructure device 122 of RF 120 channel 124 need not notify the infrastructure device 142 of RF 140 channel 144 because, even though TG B is a wide area communication talkgroup served by RF 110 and RF 140 channel 144, it is not served by RF 120 channel 124. There are no subscribers of the talkgroups served by RF 120 channel 124 present in or served by RF 140 channel 144 nor are there subscribers of the talkgroups served by RF 140 channel 144 present in or served by RF 120 channel 124, thus, the status of RF 120 channel 124 is irrelevant to TG B.

Similarly, when TG E is active on channel 1 RF 2, the infrastructure device 122 of RF 120 channel 124 notifies the infrastructure device 112 of RF 110 channel 114 and RF 130 channel 134 in order to notify subscribers of TG C that RF 120 channel 124 is not available for use. Again, the infrastructure device 122 of RF 120 channel 124 need not notify the infrastructure device 142 of RF 140 channel 144 because, even though TG B is a wide area communication talkgroup served by RF 110 and RF 140 channel 144, it is not served by RF 120 channel 124. There are no subscribers of talkgroups served by RF 120 channel 124 present in or served by RF 140 channel 144, nor are there subscribers of talkgroups served by RF 140 channel 144 present in or served by RF 120 channel 124, thus RF 120 channel's status is irrelevant to TG B.

In another scenario, TG C makes a talkgroup call, originating on RF 130 channel 134. Subscribers of TG C are served by RF 110, RF 2, as well as RF 130 channel 134. Thus, channels 114, 124, 134 are active in RF 110, 120, and 130. Subscribers in TG A, B, D, E, F, and G being served in those RF sites can already hear the audio and know it is busy. Subscribers or infrastructure device 142 of TG B in RF 140 channel 4 need to be notified, however, in the event TG B desires to make a talkgroup call, the TG B subscribers in RF 140 channel 144 need to be aware that its other subscribers being served by RF 110 channel 114 cannot hear the audio as the channel allocated to TG B in RF 3 is already in use by another group.

In another example, TG F is active on RF 130 channel 134. The infrastructure device of RF 130 channel 134 need only notify the infrastructure devices 112, 122 of RF 110 channel 114 and RF 120 channel 124 respectively so that subscribers of TG C served by these RF site/channels will be aware that RF 130 channel 134 is not available for group communication. Similarly, the same notification scheme is valid if TG G desires to make a talkgroup call in RF 130.

In a final example, if TG B is active, then channel 144 in RF 140 and channel 114 in RF 110 are both active. Thus, if the call originated in RF 140 channel 144, then the infrastructure device 142 of RF 140 channel 144 need only notify the infrastructure device 122, 132 of RF 120 channel 124 and RF 130 channel 134 respectively of its status in order to alert TG C subscribers that channel 114 in RF 110 is active or busy. When either TG H or I is active on RF 140 channel 144, however, the infrastructure device 142 of RF 140 channel 144 need only notify the infrastructure device of RF 110 channel 114 of its status because TG B is the only talkgroup affected by RF 140 channel 144 being active.

When the call ends, the call's originating RF site/channel again notifies the infrastructure devices for RF site/channels on its notification list of the call's end. Each notified infrastructure device stops retransmitting the channel busy indication for the affected talkgroup(s), and may transmit an explicit message indicating that the talkgroup's serving channels are no longer busy. A talkgroup's subscriber unit, upon receiving this message or upon the expiration of a period of time without further busy indications, indicates to its subscriber unit that the talkgroup's channels are no longer busy.

An alternative embodiment may make use of the central controller 150 illustrated in FIG. 1. While the lack of a central controller is advantageous in that it does not require the cost and performance delay associated with a central controller, for larger systems, a central controller may be desirable.

When using a central controller 150, each infrastructure device 112, 122, 132, 142 in the wide-area conventional system 100 provides to the central controller 150 the list of talkgroups served by each channel 114, 124, 134, 144 in each site 110, 120, 130, 140. Alternatively, this information may be configured in the central controller 150. Each infrastructure device 112, 122, 132, 142 for each RF site 110, 120, 130, 140 notifies the central controller 150 of the beginning and the end of any call activity, including the talkgroup(s) involved in the call. The central controller 150 determines and notifies any infrastructure device of RF site/channels whose talkgroups are affected by the call in the same way as was done by the call's originating channel infrastructure devices in the non-centralized embodiment. Notified infrastructure devices 112, 122, 132, 142 notify their subscriber units 10, 11, 12, 20, 21, 22, 30, 31, 32, 40, 41, 42 in their respective affected talkgroups.

Figure 2:
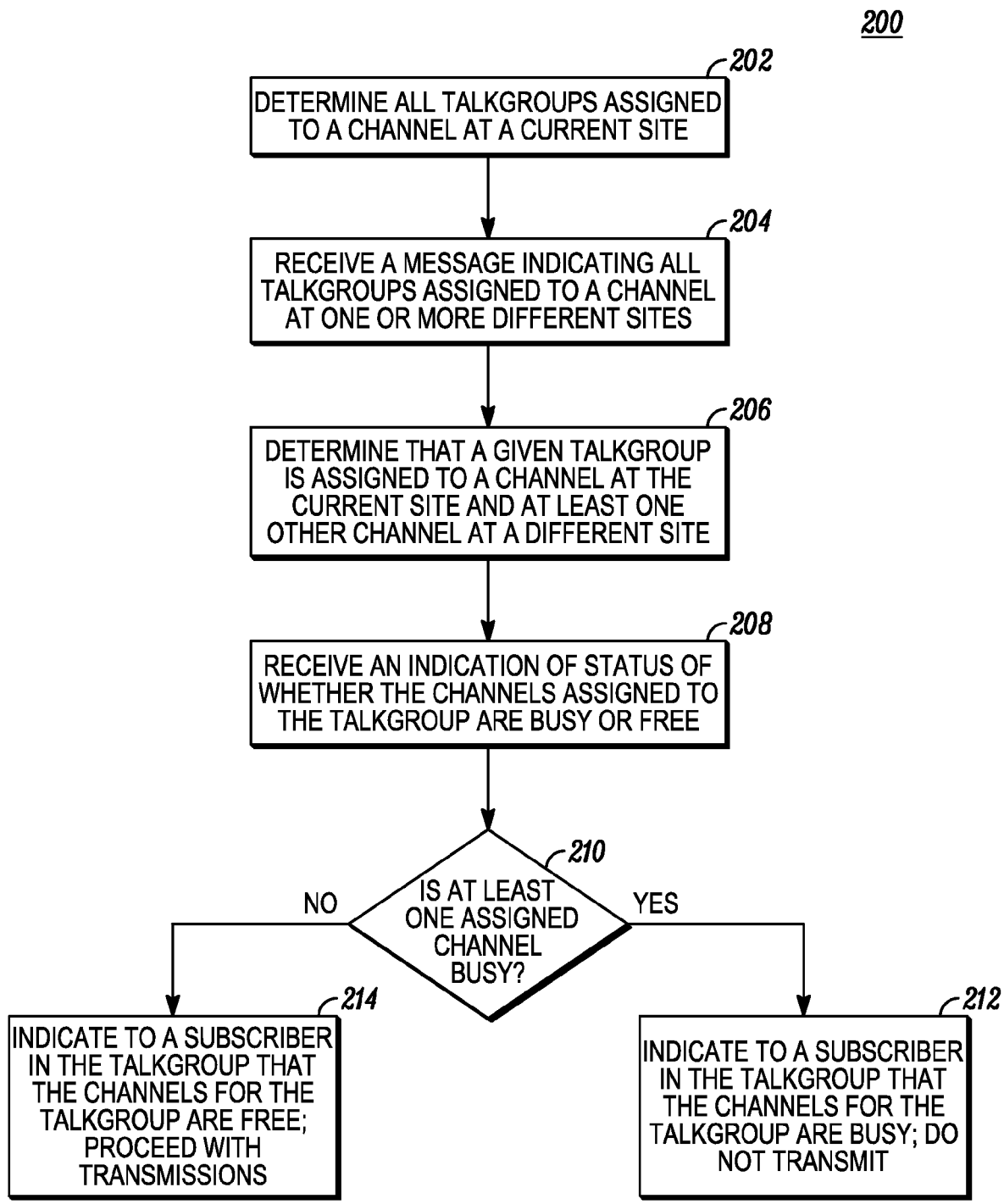
FIG. 2 is a flow diagram of a method for indicating status of channels assigned to a talkgroup in accordance with an illustrative embodiment.
Figure 3:
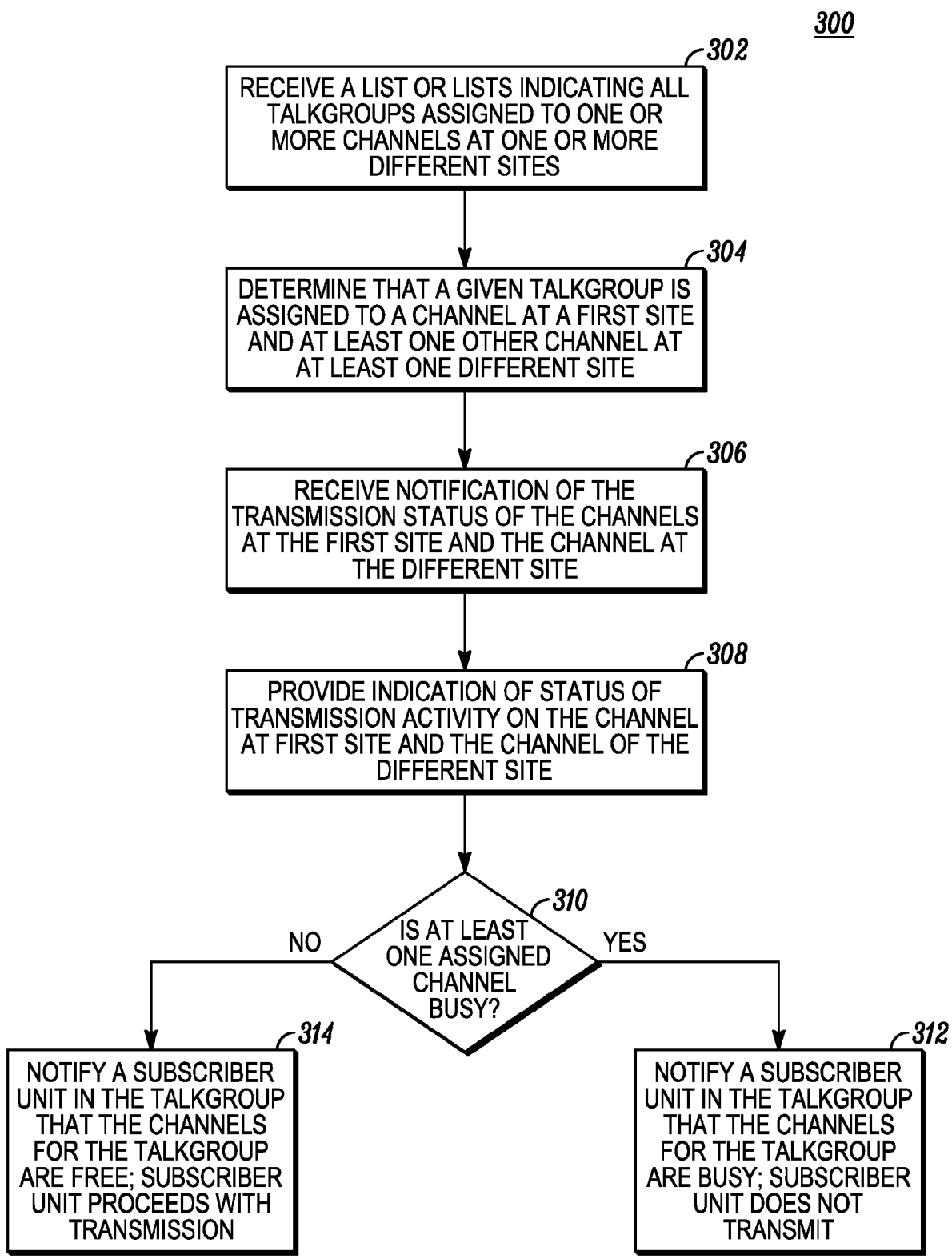
FIG. 3 is a flow diagram of a method for indicating status of channels assigned to a talkgroup in accordance with another illustrative embodiment.

FIGS. 2 and 3 are flow diagrams illustrating other embodiments of the method for indicating status of channels assigned to a talkgroup. In FIG. 2, an infrastructure device in a first site determines the channels to which talkgroups in its site are assigned, Block 202. For example, referring to FIG. 1, infrastructure device 112 determines that talkgroups A, B, and C are serviced in that site 110 and are assigned channel 114 for communication.

The infrastructure device also receives a message indicating all the talkgroups assigned to channels in the other sites in the conventional communication system, Block 204. A message is received from an infrastructure device indicating all talkgroups assigned to use the first channel for communication and for use in determining that the first channel is assigned for use by the first talkgroup. Referring again to FIG. 1 for example, infrastructure device 112 receives a message that TG C, D, and E are serviced in RF 120 by channel 124, that TG C, F, and G are serviced in RF 130 by channel 134, and that TG B, H, and I are serviced in RF 140 by channel 144.

With the given messages, the infrastructure device in the first site, for example, RF 110 can determine that a given talkgroup is assigned to both the first site as well as another channel in a second site, Block 206. In other words, the infrastructure device can determine that a first channel at a first site in a conventional communication system and a second channel at a second different site in the conventional communication system are both assigned for use by a first talkgroup for media transmissions between subscribers of the first talkgroup. For example, the infrastructure device 112 can determine, based on the messages received from other sites and its own information, that TG C is assigned to channel 114 in RF 110, to channel 124 in RF 120, and to channel 134 in RF 130.

The infrastructure device also receives notification of the status of transmission activity on the first channel, Block 208. Receiving notification of the status of transmission activity on the first channel includes receiving notification that the first channel is busy with transmission activity or is free of transmission activity. For example, infrastructure device 112 may receive notification that channel 124 is busy and that channels 134 and 144 are free. The notification of the status of transmission activity on the first channel is received from a first infrastructure device at the first site or a central controller that communicates with the first infrastructure device and a second infrastructure device at the second site. For example, infrastructure device 112 may receive the notification from central controller 150 or from individual infrastructure devices 122, 132, and 142 separately.

Based on the notification, an indication of the status of the channels assigned to the talkgroup is provided, Block 208. Providing an indication of the status of the channels assigned to the talkgroup includes providing an indication that the channels assigned to the talkgroup are not free for transmission activity, upon receiving notification that the first channel is busy. Alternatively, it includes providing an indication that the channels assigned to the talkgroup are free for transmission activity, upon receiving notification that the first channel is free when the second channel is also free of transmission activity. On receiving notification of the status of transmission activity on the second channel, the indication of the status of the channels assigned to the first talkgroup is based on the notification of the status of the transmission activity on the second channel. For example, if infrastructure device 112 receives notification from infrastructure devices 122 and 132 that channels 124 and 134 are free, infrastructure device 112 can indicate to its subscriber units that channels 124 and 134 are free for communication for TG C.

The subscriber unit(s) use the indication to determine if the assigned channel or channels are busy with transmissions, Block 210. More particularly, an infrastructure device provides an indication that the channels assigned to the talkgroup are not free for transmission activity, upon receiving notification that the first channel is busy. Alternatively, the infrastructure device provides an indication that the channels assigned to the talkgroup are free for transmission activity upon receiving notification that the first channel is free when the second channel is also free of transmission activity. If the assigned channel or channels are not busy, then the subscriber unit in the talkgroup receives an indication that the channel is free for transmission and may proceed to transmit, Block 214.

On the other hand, if the channel or channels are not free for transmission, the subscriber unit receives an indication of such, and the subscriber units can choose not to transmit, Block 212. The indication of the status of the channels assigned to the first talkgroup is used to indicate to a subscriber of the talkgroup using a subscriber unit at the second site whether to proceed with media transmissions to other members of the first talkgroup.

Similarly, an infrastructure device provides an indication that the second channel is busy with transmission activity or is free of transmission activity to indicate to a member of the first talkgroup using a subscriber unit at the first site whether to proceed with media transmissions to other members of first talkgroup. In other words, the indication of the status of the channels assigned to the first talkgroup is used to indicate to a subscriber of the talkgroup using a subscriber unit at the second site whether to proceed with media transmissions to other members of first talkgroup. Similarly, an indication may be provided that the second channel is busy with transmission activity or is free of transmission activity to indicate to a member of the first talkgroup using a subscriber unit at the first site whether to proceed with media transmissions to other members of the first talkgroup.

In another embodiment exemplified in the flowchart in FIG. 3, a central controller may be present which coordinates the status indication of channels between sites. In the embodiment of FIG. 3, a central controller receives a list or lists indicating the talkgroups assigned to one or more channels at one or more different sites, Block 302. The central controller receives a first list of talkgroups assigned to a first channel at the first site in a conventional communication system and receives a second list of talkgroups assigned to a second channel at a second site in the conventional communication system. For example, referring again to FIG. 1, the central controller 150 receives the served talkgroup TG lists of TABLES 2 and 3.

With these lists, the central controller can determine whether a given talkgroup is assigned a channel in more than one site, Block 304. In other words, based on the first and second lists, the central controller determines that the first and second channels are both assigned for use by a first talkgroup for media transmissions between members of the talkgroup. For example, as in the above example, central controller 150 determines that channels 114 and 144 both service TG B.

The central controller also receives notification of the status of the transmission activity on the channels of the various sites in the system, Block 306. For example, the central controller 150 receives notification from infrastructure devices 112 and 142 of the status of channels 114 and 144.

Based on the notification, the central controller provides an indication of the status of transmission activity on each of the channels assigned to the given talkgroup, Block 308. The central controller receives notification of the status of transmission activity on the first and second channels and based on the notification, provides to a first infrastructure device at the first site and a second infrastructure device at the second site an indication of the status of the channels assigned to the first talkgroup. In other words, the central controller provides an indication to the first infrastructure device that the second channel is assigned for use by the first talkgroup and an indication of the status of transmission activity on the second channel and also may provide an indication to the second infrastructure device that the first channel is assigned for use by the first talkgroup and an indication of the status of transmission activity on the first channel.

If at least one of the channels assigned to the given talkgroup is busy, Block 310, the central controller notifies a subscriber unit, or an infrastructure device in the site which notifies a subscriber unit, that the channel is not free for transmissions, Block 312. The subscriber may then choose not to transmit.

On the other hand, if the central controller receives indication that the assigned channels are free, Block 310, then the central controller may notify the subscriber unit, or an infrastructure device, in the site which notifies a subscriber unit, in a talkgroup that the channel is free for transmission, Block 314. For example, the notification is used by the first infrastructure device to indicate to a first member of the first talkgroup using a first subscriber unit at the first site whether to proceed with media transmissions to other members of the first talkgroup; and is used by the second infrastructure device to indicate to a second member of the first talkgroup using a second subscriber unit at the second site whether to proceed with media transmissions to other members of the first talkgroup. The subscriber unit may then transmit, knowing that all subscribers in the given talkgroup will have an open channel to receive the transmission.

This method provides a novel way of enabling talkgroups, subscribers, and/or subscriber units to ascertain whether the channel(s) of a conventional wide area communication network which serve their talkgroup is busy with call activity. This enables the extension of conventional systems to multiple channels over multiple sites while still enabling subscribers to check for other call activity prior to talking on their subscriber unit.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for indicating status of channels assigned to a talkgroup described herein. The non-processor circuits may include, but are not limited to, a radio receiver, a radio transmitter, signal drivers, clock circuits, power source circuits, and user input devices. As such, these functions may be interpreted as steps of a method to perform the indicating of status of channels assigned to a talkgroup described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for indicating status of channels assigned to a talkgroup, the method comprising:
    determining, at a second infrastructure device at a second site, that a first channel at a first site in a conventional communication system and a second channel at the second site in the conventional communication system are both assigned for use by a first talkgroup for transmissions between subscribers of the first talkgroup;
    receiving, at the second infrastructure device at the second site, notification of status of transmission activity on the first channel from a first infrastructure device at the first site; and
    based on the notification, providing, by the second infrastructure device at the second site, an indication of the status of the channels assigned to the first talkgroup.

2. The method of claim 1, wherein receiving, at the second infrastructure device at the second site, notification of the status of transmission activity on the first channel comprises receiving notification that the first channel is busy with transmission activity or is free of transmission activity.

3. The method of claim 1, wherein providing the second, by the second infrastructure device at the second site, an indication of the status of the channels assigned to the first talkgroup comprises:
    providing an indication that the channels assigned to the first talkgroup are not free for transmission activity, upon receiving notification that the first channel is busy; or
    providing an indication that the channels assigned to the first talkgroup are free for transmission activity, upon receiving notification that the first channel is free when the second channel is also free of transmission activity.

4. The method of claim 1, wherein the notification of the status of transmission activity on the first channel is received from a central controller that communicates with the first infrastructure device at the first site and the second infrastructure device at the second site.

5. The method of claim 1, wherein the indication of the status of the channels assigned to the first talkgroup is used to indicate to a subscriber of the first talkgroup using a subscriber unit at the second site whether to proceed with transmissions to other subscribers of first talkgroup.

6. The method of claim 1 further comprising providing, by the second infrastructure device at the second site, an indication that the second channel is busy with transmission activity or is free of transmission activity to indicate to a subscriber of the first talkgroup using a subscriber unit at the first site whether to proceed with transmissions to other subscribers of first talkgroup.

7. The method of claim 1 further comprising receiving, at the second infrastructure device at the second site, a message from the first infrastructure device at the first site indicating all talkgroups assigned to use the first channel for use in determining that the first channel is assigned for use by the first talkgroup.

8. The method of claim 1 further comprising receiving, at the second infrastructure device at the second site, notification of the status of transmission activity on the second channel, wherein the indication of the status of the channels assigned to the first talkgroup is also based on the notification of the status of the transmission activity on the second channel.

9. A method for indicating status of channels assigned to a talkgroup, the method comprising:
    receiving, at a central controller, a first list of talkgroups assigned to a first channel from a first infrastructure device at a first site in a conventional communication system;
    receiving, at the central controller, a second list of talkgroups assigned to a second channel from a second infrastructure device at a second site in the conventional communication system;
    determining, at the central controller, based on the first and second lists, that the first and second channels are both assigned for use by a first talkgroup for transmissions between subscribers of the talkgroup;
    receiving, at the central controller, notification of the status of transmission activity on the first channel from the first infrastructure device at the first site and the second channel from the second infrastructure device at the second site; and
    based on the notification, providing by the central controller, to the first infrastructure device at the first site and the second infrastructure device at the second site an indication of the status of the channels assigned to the first talkgroup.

10. The method of claim 9, wherein the indication of the status of the channels assigned to the first talkgroup comprises:
    an indication to the first infrastructure device at the first site that the second channel is assigned for use by the first talkgroup and an indication of the status of transmission activity on the second channel; and an indication to the second infrastructure device at the second site that the first channel is assigned for use by the first talkgroup and an indication of the status of transmission activity on the first channel.

11. The method of claim 9, wherein the indication of the status of channels assigned to the first talkgroup:
- is used by the first infrastructure device at the first site to indicate to a first subscriber of the first talkgroup using a first subscriber unit at the first site whether to proceed with transmissions to other subscribers of the first talkgroup; and
- is used by the second infrastructure device at the second site to indicate to a second subscriber of the first talkgroup using a second subscriber unit at the second site whether to proceed with transmissions to other subscribers of the first talkgroup.

12. A method for indicating status of channels assigned to a talkgroup, the method comprising:
- determining, at an infrastructure device, that a plurality of channels at a respective plurality of sites in a conventional communication system are assigned for use by a first talkgroup for transmissions between subscribers of the first talkgroup;
- receiving, at the infrastructure device, notification of status of transmission activity on each of the plurality of channels from other infrastructure devices at the respective sites; and
- based on the notification, providing, by the infrastructure device, an indication of the status of the channels assigned to the first talkgroup.

13. The method of claim 12, wherein receiving, at the infrastructure device, notification of the status of transmission activity on the plurality of channels comprises receiving notification that each of the plurality of channels is either busy with transmission activity or free of transmission activity.

14. The method of claim 12, wherein providing, by the infrastructure device, an indication of the status of the channels assigned to the first talkgroup comprises:
- providing an indication that the plurality of channels assigned to the first talkgroup are not free for transmission activity, upon receiving notification that at least one of the plurality of channels is busy; or
- providing an indication that the plurality of channels assigned to the first talkgroup are free for transmission activity, upon receiving notification that each of the plurality of channels is free of transmission activity.

15. The method of claim 12, wherein the indication of the status of the channels assigned to the first talkgroup is used to indicate to at lease one of the subscribers of the first talkgroup using a subscriber unit whether to proceed with transmissions to other subscribers of first talkgroup.

16. The method of claim 12 further comprising providing by the infrastructure device, an indication that at least one of the plurality of channels is busy with transmission activity or each of the plurality of channels are free of transmission activity to indicate to at lease one of the subscribers of the first talkgroup using a subscriber unit whether to proceed with transmissions to other subscribers of first talkgroup.

17. The method of claim 12 further comprising receiving, at the infrastructure device, a message from each of the plurality of sites indicating all talkgroups assigned to use the respective plurality of channels for use in determining that the plurality of channels are assigned for use by the first talkgroup.

\* \* \* \* \*

UNITED STATES PATENT AND TRADEMARK OFFICE
CERTIFICATE OF CORRECTION

PATENT NO. : 8,116,798 B2
APPLICATION NO. : 12/344932
DATED : February 14, 2012
INVENTOR(S) : Kuehner et al.

Page 1 of 1

It is certified that error appears in the above-identified patent and that said Letters Patent is hereby corrected as shown below:

In Column 15, Line 64, in Claim 3, delete "providing the second," and insert -- providing, --, therefor.

In Column 16, Line 58, in Claim 9, delete "providing" and insert -- providing, --, therefor.

In Column 18, Line 17, in Claim 15, delete "lease" and insert -- least --, therefor.

In Column 18, Line 24, in Claim 16, delete "lease" and insert -- least --, therefor.

Signed and Sealed this
Twenty-fifth Day of December, 2012

David J. Kappos
*Director of the United States Patent and Trademark Office*